United States Patent
Schild

[11] 3,922,076
[45] Nov. 25, 1975

[54] MOTION PICTURE CAMERA

[75] Inventor: Josef Schild, Vienna, Austria

[73] Assignees: Karl Vockenhuber; Raimund Hauser, both of Vienna, Austria

[22] Filed: Nov. 20, 1974

[21] Appl. No.: 525,647

[30] Foreign Application Priority Data
Nov. 26, 1973 Austria .............. 9875/73

[52] U.S. Cl. .............. 352/169; 352/176; 352/121; 352/137
[51] Int. Cl.² .......................... G03B 21/38
[58] Field of Search .......... 352/169, 174, 176, 121, 352/137

[56] References Cited
UNITED STATES PATENTS
3,705,764  12/1972  Reinsch ............. 352/169
3,722,989  3/1973   Inoue ............... 352/169
3,762,806  10/1973  Roth ................ 352/169
3,767,298  10/1973  Reinsch ............. 352/169

Primary Examiner—Monroe H. Hayes
Attorney, Agent, or Firm—Fleit & Jacobson

[57] ABSTRACT

There is disclosed a shutter control device for a rotatable shutter which is coupled to a drive mechanism which includes a rotation reversing means. The drive mechanism is controlled by release means according to whether the shutter is used to take time-delay exposures or running film exposures. The shutter also includes stop means for halting the shutter in the desired position with respect to the film.

6 Claims, 9 Drawing Figures

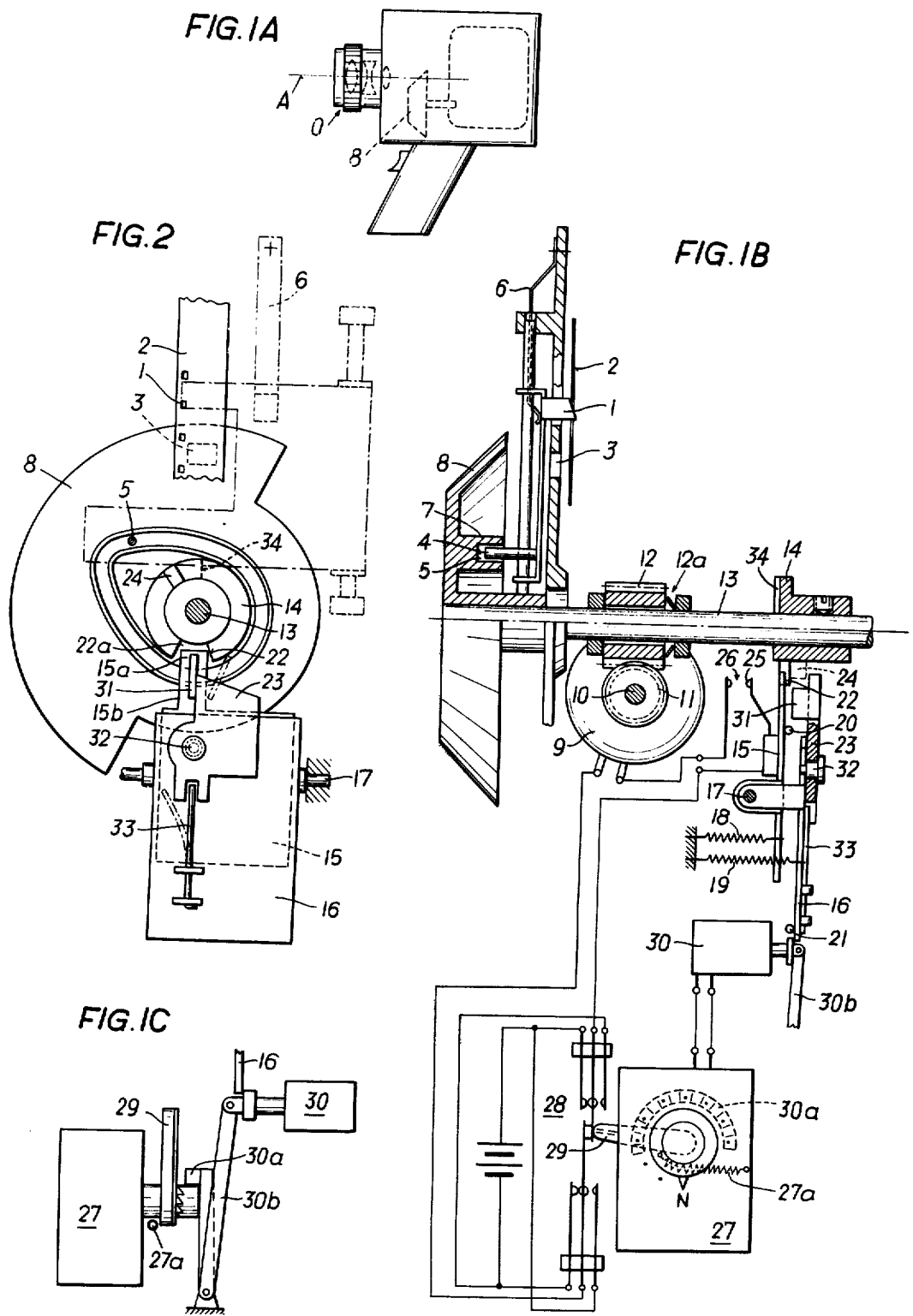

MOTION PICTURE CAMERA

BACKGROUND OF THE INVENTION

The invention relates to a motion picture camera having a shutter that is insertable during the phase of film shift into the optical path of photographic rays, said shutter is coupled to a drive mechanism maneuverable by a release in such a way that when taking pictures on running film a stop surface connected with the drive mechanism and engaged with a primary stop face of a fixably mounted counterstop to halt the shutter in a position where it screens off the path of the rays.

A known motion picture camera is adapted for taking sequences or single exposure frames, in which a detent halts the shutter after taking a film shot in a position that screens off the path of the photographic rays whereas in the case of a time-exposure shot the shutter is halted in a position that opens said ray path. In the known device, when the release is actuated, the motor advances the shutter to where the film is screened from incident light. In order to bring the moving shutter to a stop in either of these two positions, it is necessary in this device to provide the detent with two reciprocally staggered lug cams, axially as well as radially. A further known solution includes the use of two co-axial shutter blades of equal size which however can be offset with respect to each other so that aperture sectors of varying size could be adjusted. Both known designs have the disadvantage of comprising a relatively large number of parts, and having these parts connected to the moving shutter. As a result the operation of the camera encounters much undesirable inertia which must in turn be offset by counterweighting so as not to hamper the true cycling of the shutter.

The present invention is intended to obviate these disadvantages in such a way that a rotation reversing device is incorporated in the drive mechanism. Further when taking time exposures the fixed counter-stop face has a second stop face, which, when actuating the reversing mechanism can be made to interact with the stop face in the drive mechanism to halt the shutter in a position that opens the way for the photographic rays. The stop face related to the drive mechanism can in very simple manner be designed in the form of a groove radially distant from the axis of rotation and not continuous in length, with the ends of the groove being adjusted to the particular position of the shutter. In one embodiment, the invention comprises a stop face related to the drive mechanism in the form of a lug that extends over a portion of the moving part. The sides of the lug are respectively adjusted to the shutter positions to either screen the rays or open the way for them.

In accordance with a an embodiment of the invention, a special advantage is afforded by including a paw claw of familiar design for continuous advancing of the film.

Further advantages and distinguishing features of the invention may be seen in the description of the diagrammatically presented design, in which FIG. 1 shows a mechanism in accordance with the teachings of the present invention and FIG. 2 shows a rear view of the mechanism as represented in FIG. 1 and FIGS. 3 – 5 show a further embodiment of the invention.

DESCRIPTION OF THE PREFERRED EMBODIMENTS

Figure 3:
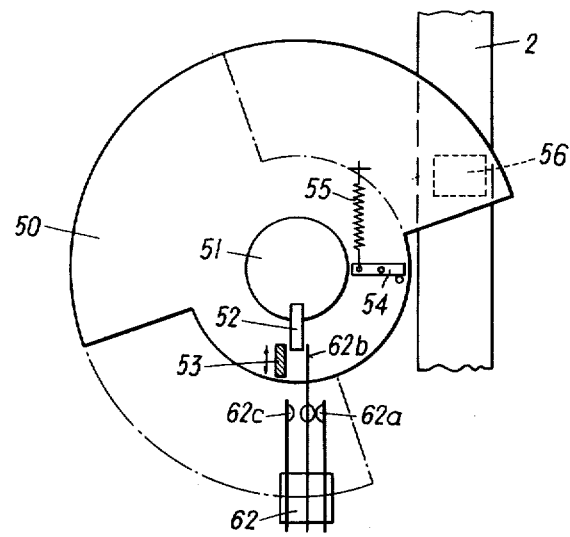

A moving picture camera shown in FIG. 1 A includes a claw mechanism of familiar design behind an objective O with an optical axis A, which moves film 2 past a picture gate 3 (FIG. 1 B). The travel stroke of the claw is transferred via a key 4 to a cam graph 5, whereas the engagement lift is controlled by a flat spring 6 acting on pawl 1. The cam graph 5 is arranged in a flange section 7 of a cup-shaped shutter 8 which shutter intermittently blanks out picture gate 3 during the camera's operation. A motor 9 drives shutter 8, said motor not being shown in FIG. 2, to simplify the representation. The axis 10 of the motor carries a worm gear 11 which moves a cog (12) mounted fixedly on axis 13 of the shutter.

Furthermore, cam element 14 is mounted fixedly on shaft 13. Operating together with release levers 15 and 16, of which release lever 15 is the release for normal operation, while release lever 16 is for single picture frames. Both levers 15 and 16 are pivotable around a fixedly mounted axis 17 and held by tension springs 18 and 19 against the but faces 20 and 21. During stoppage of the camera one end 15 a of the release lever is housed in a recess 22 a of the cam element 14 release 15 touches an abuttment of cam element 14, and a part 23 flexibly connected with release 16 lies against cam element 14 outside of the path described by a lug 14.

Under normal operation release lever 15 is pressed against the action of spring 18 and its end 15a is taken out of the path of but 22. A contact arm 25 connected with release 15 closes a switch 26 in the current supplying the motor. A function selector switch 27 is operated when setting operations to N (Normal) holds contact bridge 28 by way of cam 29 to make motor 9 run "forward." In such an operation, claw 1 begins to advance film 2 in forward direction. Switch 27 is shown in FIG. 1 B in a turned position for purposes of clarity, with respect to the mechanical portions. Its proper position relative to a magnet 30 may be seen in FIG. 1 C.

At the close of normal camera operation, release 15 is opened and its end 15 a comes into the path of the abuttment 22. At the same time the current supplying the motor is interrupted by switch 26. When abuttment 22 creeps up on release 15, the axis of the shutter 13 or rather the shutter 8 is halted, whereby the picture gate 3 is blanked out by its diaphragm sector (See FIG. 2).

In order to switch over to single picture frames with time exposure selector switch 27 (cf. FIG. 1 B) is rotated clockwise against a return spring 27a, so that cam 29 with switch 28 becomes disengaged, and the latter reverses the polarity of the motor circuit to "reverse" in response to the spring tension. The selector switch 27 is used to adjust the exposure time simultaneously with the switchover operation whereby a lifting magnet 30 controls the duration of the release. Theoretically it would be possible to place another switch between selector switch 27 and lifting magnet 30, which switch would trigger the actual setting for single-frame pictures. However, in accordance with the representation in FIG. 1B lifting magnet 30 is energized with the switching of selector 27. The latter clamps cam 29 against the force of spring 27a by means of a selector quadrant 30a via lever 30b (FIG. 1C) and pivots the release lever 16 counter-clockwise. In this way, a lug 31 of the pivotable part 23 at the release creeps up on release lever 15 and also pivots the latter counter-clockwise. This closes motor switch 26, and also releases shutter shaft 13 for the reverse drive. Shutter 8 also revolves in reverse direction, film 2 continues to advance forward because the steering curve 5 is made symmetrically for the travel of the claw, and the pawl claw 1 at first slides over the sprocket hole near the lift to take the film back and engages at the facing lift facing in the opposite direction through spring 6 with the next sprocket hole. After shutter shaft 13 has completed approximately one third of the rotation, lug 24 of cam element 14 runs up on part 23 and pivots the latter around an axis 32 of release lever 16 against the effect of a spring 23 (dashdotted position in FIG. 2). In so doing lug 31 releases release lever 15, which returns to its neutral position under the effect of spring 18, until it stops at cam element 14. Consequently, the motor operated switch 26 initially remains turned off. The shutter, driven counter-clockwise continues to rotate until a stop 34 of cam element 14 creeps up at the end 15b of release lever 15. The shutter then remains in a position rotated 180° (referred to FIG. 2), in which the projector gate 3 is opened. The motor, to be sure, continues to make a complete revolution, but the friction clutch 12a between cog wheel 12 and shaft 13 makes a full revolution. The lifting magnet 30 again loses current at the end of the adjusted exposure time, whereby release lever 16 is returned to its neutral position by spring 19 and in the process, part 23 also returns to its initial position (extended description in FIG. 2). In order to return the shutter to the position where it blocks out the path of the photographic rays, quadrant 30a (cf. FIG. 1C) is displaced clockwise by magnet 30, releasing cam 29. Cam 29 then returns to the position shown in FIG. 1B under tension of spring 27a, so the motor 9 again runs forward until release lever 15 in front of stop 22 reaches the recess 22 a in cam element 14. Switch 26 is then opened and the motor stops.

The camera of the invention permits taking of single-frame pictures with an exposure time which is the same as that for taking motion pictures. For this purpose, selector switch 27 remains in the position N, so that motor B remains in the "forward" mode. However, the release takes place with release lever 16 either directly or alternatively, via a wire release. Lifting magnet 30 thereby loses current. The course of operation is substantially the same as with long time exposure, with the exception that shutter 8 (refer to FIG. 2.) turns clockwise. Lug 24 again displaces part 23 and release 15 is unlocked. The shutter is arrested, corresponding to a normal operation in the closed position, in that stop 22 runs up against end 15a of release lever 15. The film rewinding machinery is not shown in the diagram. This may either take the form of an insertable idler, in order to maintain the rewinding direction when switching the rotation direction, but a claw pawl gear may also be used, which is independent of the rotation direction of the drive motor. Such a pawl gear has become familiar from OE-PS 296 021.

Figure 4:
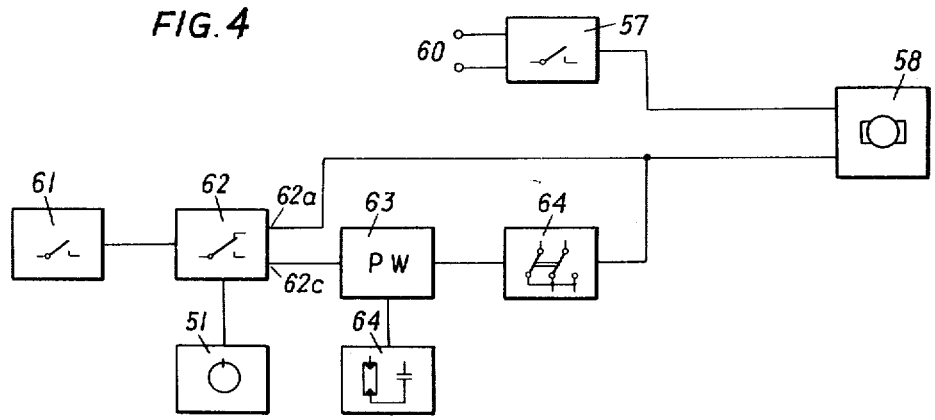

Another embodiment of the invention is shown in FIGS. 3–5. The film carrier arrangement is similar to the construction shown in FIGS. 1B and 2, and is omitted for the sake of simplicity. A drive shaft 51 for a shutter 50 carries a stop 52 (similar to the stop 22 in FIGS. 1B and 2), in whose path either a counter stop 53 can be inserted. The counter stop corresponds to lever 15. There may also be another pivoted counter stop 54, which blocks the rotation of drive shaft 51 from moving counter-clockwise.

During forward motion (clockwise rotation of shaft 51) counter stop 53 is switched away from the path of stop 52 after being released by a camera trigger 57 (FIG. 4) and the shutter is released for rotation clockwise. Thereby a camera motor 58 receives current from a power source connected at the inlet 60.

Abutment 52 of the shaft 51 bumps against abutment 54 with each rotation and twists the latter against spring 55 counter-clockwise. In order to eliminate noise, counter abutment 54 may be made of plastic, or with forward motion may be entirely removed from the path of abutment 52. At the end of exposure, counter abutment 53 is again switched into the path of abutment 52, whereby shutter 50 is halted in the position sketched by solid lines; wherein it shields film picture 56 from incident light.

In order to take a picture with delayed-time exposure, a preselector switch 61 is first closed for delayed time exposure, whereby counter abutment 53, (for example a cam, not shown, which is connected to a switch 61,) may be switched out of the orbit of abutment 52. The control of motor 58 in this case is by means of a toggle switch 62 set in motion by a pre-selector switch 61. The switch 61 first switches motor 58 to forward motion by means of motor contacts 62a, 62b and is, usually closed. After a rotation, abutment 52 reaches the middle contact 62b and switches the latter to contact 62c for a programming operation. This program element 63 operates for a length of correct exposure time calculated from an exposure test circuit 64. If when switching on program element 63 the film should be blocked out by the rotary disk 50 of the shutter, a pole reverse 65 activated by the program element switches motor 58 to reverse. Abutment 52 strikes against counter abutment 54 after approximately a quarter revolution, and shutter 50 remains in this position shown by a dotted line in FIG. 3. After termination of the exposure calculated by test circuit 64 the program element switches motor 58 again to forward via change-over switch 65. If another time exposure is to follow this exposure, counter abutment 53 remains switched away from the path of the shutter shaft abutment 52. Not until switch 61 is again open will any further delay-time exposures take place, and the shutter is halted in its position shown in FIG. 3 in solid lines.

Figure 5A:
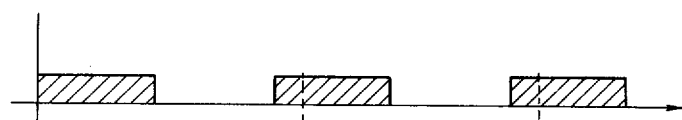
Figure 5B:
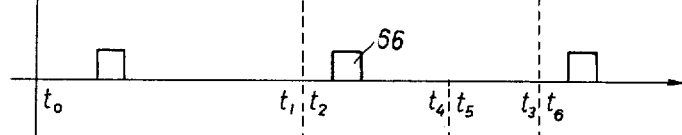
Figure 5C:
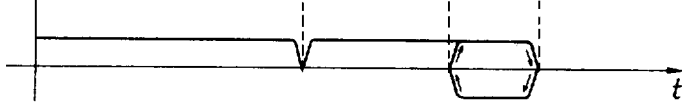

FIGS. 5a, 5b, contain a diagram of the expiration delayed-time exposure under the invention. FIG. 5c shows the direction in which the motor rotates at a particular time.

The shaded areas shown in FIG. 5a represent the dark periods on the film during a rotation of the shutter. In these dark periods the advance of the film picture frames takes place by means of the claw during stroke of the claw 66 (cf. FIG. 5b and claw design according to FIGS. 1 and 2).

In exposing a film sequence in the forward direction, the shutter would be halted after a period $t_0 - t_1$ in the position in which it blocks out the film. In a succeeding exposure of a film picture under delayed time the motor is switched forward up to time $t_3$, whereby the next film picture is initially switched by the claw into the projector gate (claw stroke 66). By switching on the program element 63 to the $t_3$ moment motor 58 is reverse-poled, and the shutter releases the film picture for further exposure ($t_4$). As soon as the exposure time ($t_4 - t_5$) is reached by test circuit 64, program element 63 again switches the motor to forward, and the shutter is halted at the $t_6$ moment in a closed position.

Numerous developments are possible within the scope of the invention. For example, a motion lapse accelerator could be attached to the selector switch, which acceleration would release a single-picture frame at predetermined intervals.

I claim:

1. A shutter control means for a camera comprising:
   a rotatable shutter;
   a stop face means connected to said shutter, comprising a first and second stop faces;
   a release means comprising first and second counter stop faces positioned to engage said first and second stop faces to respectively close and open said shutter;
   a rotatably switchable drive mechanism, connected to the shutter to rotate same in both the clockwise and the counter-clockwise direction comprising a switch means for activating said drive mechanism, said switch means being controlled by said release means so that said drive mechanism is inoperative when said first stop face is in engagement with said first counter stop face; and
   a delay-time switch for controlling said drive mechanism comprising a normal mode system wherein said drive mechanism is driven in a first direction so that said shutter rotates continuously and a delayed time exposure system wherein said drive mechanism is rotated in the opposite direction until said second stop face engages said second counter stop face to open said shutter, said shutter remaining open until a timing device of said time exposure system causes said time exposure system to re-switch so that after a given time, said drive mechanism is rotated in said first direction until said first stop face engages said first counter stop face to thereby close said shutter.

2. The shutter control defined in claim 1, further including a blocking means for maintaining said shutter in the open position and a third counter stop face connected to said shutter and rotatable therewith, said shutter being held in the open position by engagement of said blocking means and said third counter stop face during rotation of said shutter in the counter-clockwise direction.

3. The shutter control defined in claim 2 wherein said blocking means comprises a pivotable lever located in the path of said third stop face and an arresting means for resisting pivoting of said pivotable lever.

4. The shutter control defined in claim 3 further including a toggle switch located in the path of said third stop face for activating a programming element of the type which is used to control the duration of the switch-over of said drive mechanism from rotation in the clockwise direction to rotation in the counterclockwise rotation.

5. The shutter control defined in claim 4 wherein said programming element is associated with an exposure meter of the type used to control film exposure times.

6. The shutter control defined in claim 1, further including a film moving means.

* * * * *